(12) United States Patent
Hyatt

(10) Patent No.: US 7,567,287 B2
(45) Date of Patent: Jul. 28, 2009

(54) ROTATING PRISM FOR A DIGITAL CAMERA IN A PORTABLE MOBILE COMMUNICATION DEVICE

(75) Inventor: Edward Craig Hyatt, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 520 days.

(21) Appl. No.: 11/533,424

(22) Filed: Sep. 20, 2006

(65) Prior Publication Data
US 2008/0068451 A1 Mar. 20, 2008

(51) Int. Cl.
*H04N 5/225* (2006.01)
(52) U.S. Cl. ............... 348/340; 348/374; 348/376; 348/552; 455/575.3
(58) Field of Classification Search ............... None
See application file for complete search history.

(56) References Cited

U.S. PATENT DOCUMENTS

| | | | |
|---|---|---|---|
| 6,532,035 B1 * | 3/2003 | Saari et al. | 348/14.02 |
| 6,898,301 B2 * | 5/2005 | Iwanaga | 382/124 |
| 6,917,385 B1 * | 7/2005 | Narabu | 348/340 |
| 6,992,699 B1 * | 1/2006 | Vance et al. | 348/207.99 |
| 7,375,759 B2 * | 5/2008 | Lin | 348/371 |
| 2002/0067426 A1 * | 6/2002 | Nagata et al. | 348/373 |
| 2003/0036365 A1 | 2/2003 | Kuroda | |
| 2003/0162564 A1 * | 8/2003 | Kimura et al. | 455/556 |

FOREIGN PATENT DOCUMENTS

| | | |
|---|---|---|
| EP | 0862079 | 9/1998 |
| WO | 20050099234 | 10/2005 |
| WO | 20060087599 | 8/2006 |

OTHER PUBLICATIONS

Sony Ericsson Mobile Communications AB, International Search Report, corresponding International Patent Application No. PCT/US2007/064574, dated Nov. 7, 2007.
Sony Ericsson Mobile Commuications AB, Written Opinion, corresponding International Patent Application No. PCT/US2007/064574, dated Nov. 7, 2007.
International Preliminary Report on Patentability, corresponding to International Patent Application No. PCT/US2007/064574, dated Jan. 14, 2009.

* cited by examiner

*Primary Examiner*—Ngoc-Yen T Vu
(74) *Attorney, Agent, or Firm*—Frederick D. Bailey; Moore & Van Allen, PLLC

(57) ABSTRACT

The present invention presents an apparatus that can be manipulated to provide multiple views to a single camera module. The apparatus includes a cylindrical rotating prism assembly that can be rotated about its vertical axis. A first reflective surface reflects the field of view of a lens assembly 90° along the vertical axis of the cylindrical rotating prism assembly. The camera module is positioned beneath the cylindrical rotating prism assembly to capture an image reflected by the first reflective surface along the vertical axis of the cylindrical rotating prism assembly. An illumination source is positioned above the cylindrical rotating prism assembly and emits an illumination beam along the same vertical axis that is reflected by a second reflective surface through an illumination aperture that illuminates the field of view. The entire assembly can be rotated to take advantage of multiple lens assemblies.

9 Claims, 5 Drawing Sheets

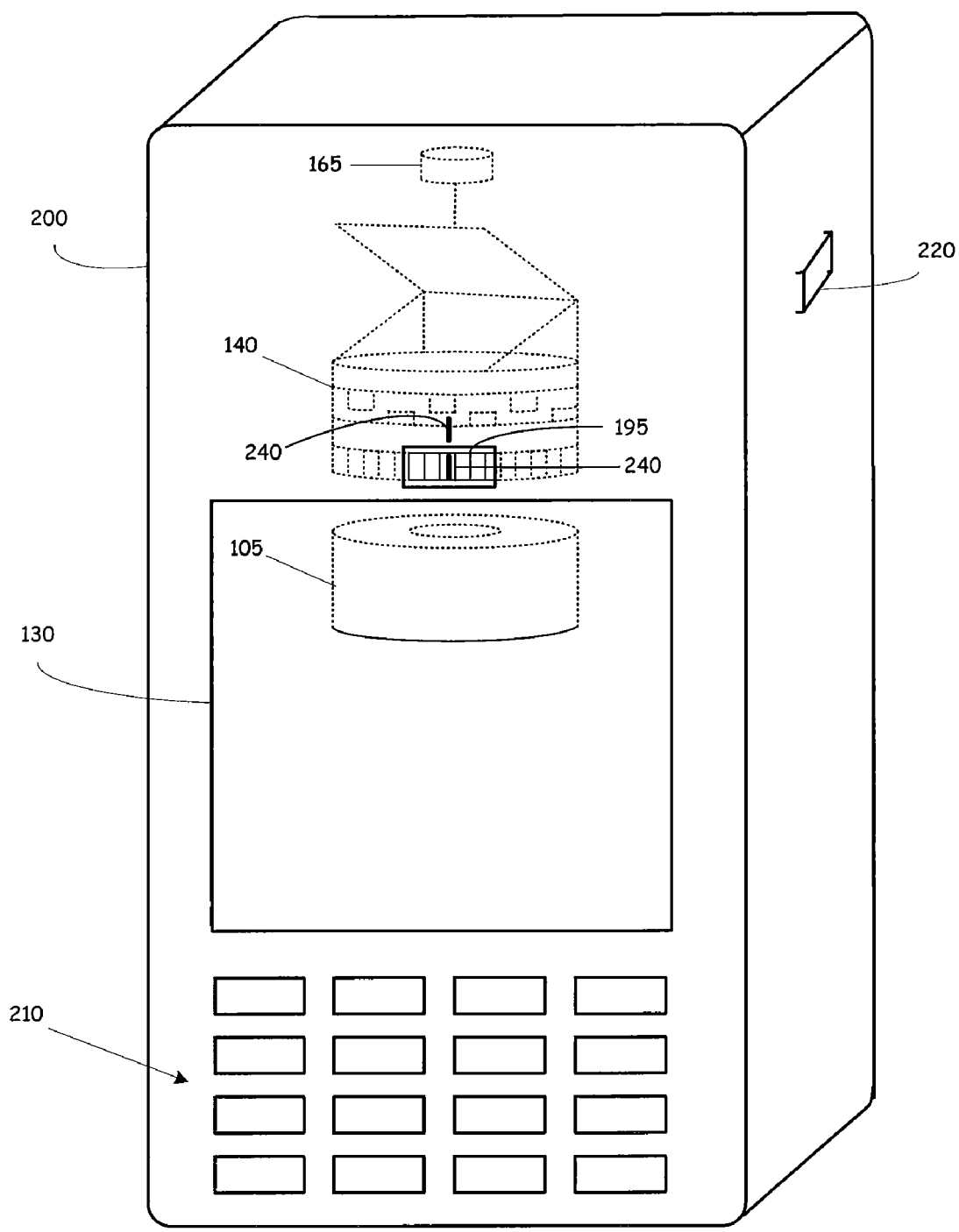

FIGURE 5
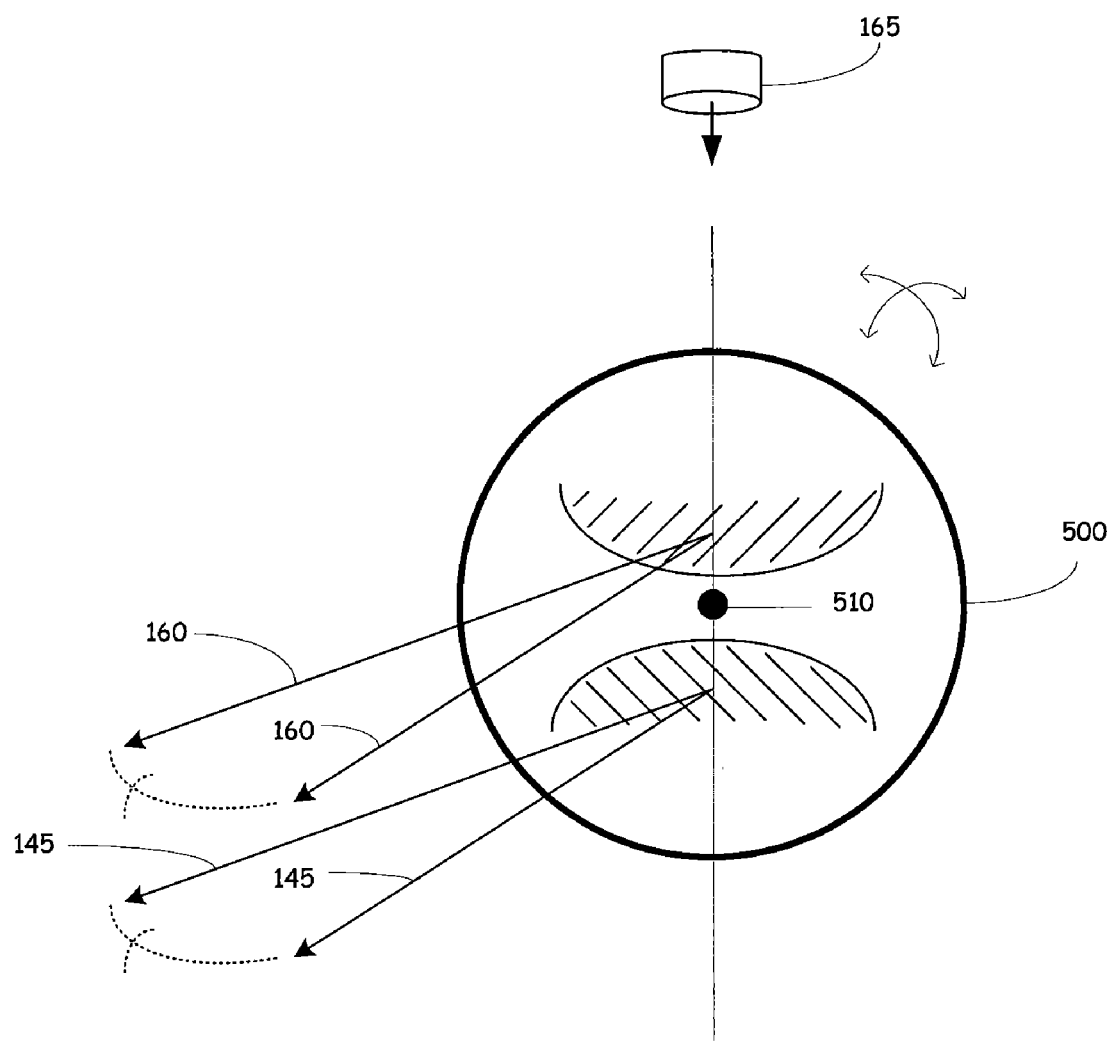
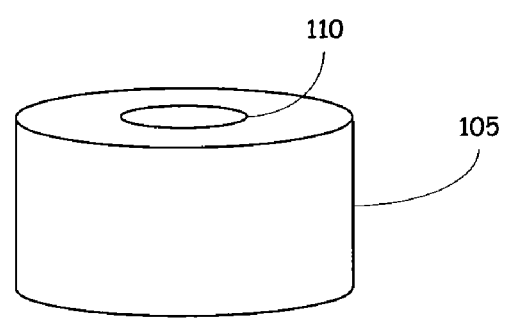

ROTATING PRISM FOR A DIGITAL CAMERA IN A PORTABLE MOBILE COMMUNICATION DEVICE

BACKGROUND OF THE INVENTION

Portable mobile communications devices such as mobile phones are becoming more sophisticated and include many new features and capabilities. One such feature is the inclusion of digital camera/video technology into the portable mobile communication device. Many portable mobile communication devices even offer video-conferencing as a feature. Video-conferencing allows users to see and speak to each other simultaneously. Obviously, to see and be seen by the other user, the portable mobile communication device must have a camera lens positioned on the same side of the portable mobile communication device as the display screen. This is the opposite configuration for standard digital photography that uses the display screen as a viewfinder for taking photographs. Thus, when taking pictures, the camera lens should be on the opposite side of the display screen.

To date, portable mobile communication devices that offer both digital photography and video-conferencing have had to include two digital camera mechanisms. One is mounted opposite the display screen for photography purposes and the other is mounted on the same side as the display screen for video-conferencing purposes. Two camera devices, however, take up additional valuable internal space within the portable mobile communication device. What is needed is an apparatus that can utilize a single camera device to operate in both a digital camera and video-conferencing mode. Such a configuration would be more cost effective than using additional camera modules and more electrically and mechanically reliable than swiveling the entire mechanism (including a portion of the exterior housing of the device).

SUMMARY

The present invention presents an apparatus that can be manipulated to provide a plurality of views to a single camera module. The apparatus includes a cylindrical rotating prism assembly that permits light to pass along and can be rotated about its vertical axis. A first reflective surface reflects the field of view of a lens assembly 90° along the vertical axis of the cylindrical rotating prism assembly. A stationary camera module is positioned beneath and along the vertical axis of the cylindrical rotating prism assembly to capture an image reflected by the first reflective surface along the vertical axis of the cylindrical rotating prism assembly. A stationary illumination source is positioned such that an illumination beam is directed along the vertical axis of the cylindrical rotating prism assembly and is reflected by a second reflective surface through an illumination aperture that is positioned in-line with the lens assembly and illuminates the field of view of the lens assembly. The entire assembly can be rotated to take advantage of multiple lens assemblies that can be ringed about the housing of the device.

The cylindrical rotating prism assembly further includes a friction surface that rings a portion of the cylindrical rotating prism assembly. When this surface is mechanically engaged it causes the cylindrical rotating prism assembly to rotate. A position encoder rings a portion of the cylindrical rotating prism assembly and is optically coupled with a position encoder sensor for sensing the position of the position encoder. Data from the position encoder sensor can be used to automatically drive a prism motor to rotate the cylindrical rotating prism assembly to a desired position. The prism motor is coupled with a second friction surface that engages the friction surface portion of the rotating prism assembly. Moreover, the second friction surface can be manually engaged by the user to rotate the rotating prism assembly. The prism motor can also be programmed to allow for horizontal panning of the image presented by the lens assembly.

The entire apparatus can be housed and integrated into a portable mobile communications device such as, but not limited to, a mobile phone. When integrated into a portable mobile communications device, the user can take digital photographs using one lens assembly and perform video-conferencing using another lens assembly without the need for a second camera module. The apparatus may also be integrated into a digital camera device to provide motorized image panning, motorized face tracking, lens selection, etc.

BRIEF DESCRIPTION OF THE DRAWINGS

FIG. 2 illustrates the rotating prism assembly of FIG. 1 embodied in a portable mobile communications device.

FIG. 5 illustrates how a spherical prism assembly can be manipulated to provide for horizontal and vertical panning without altering the orientation of the portable mobile communication device.

DETAILED DESCRIPTION OF THE PREFERRED EMBODIMENTS

The following detailed description of embodiments refers to the accompanying drawings, which illustrate specific embodiments of the invention. Other embodiments having different structures and operations do not depart from the scope of the present invention.

Figure 1:
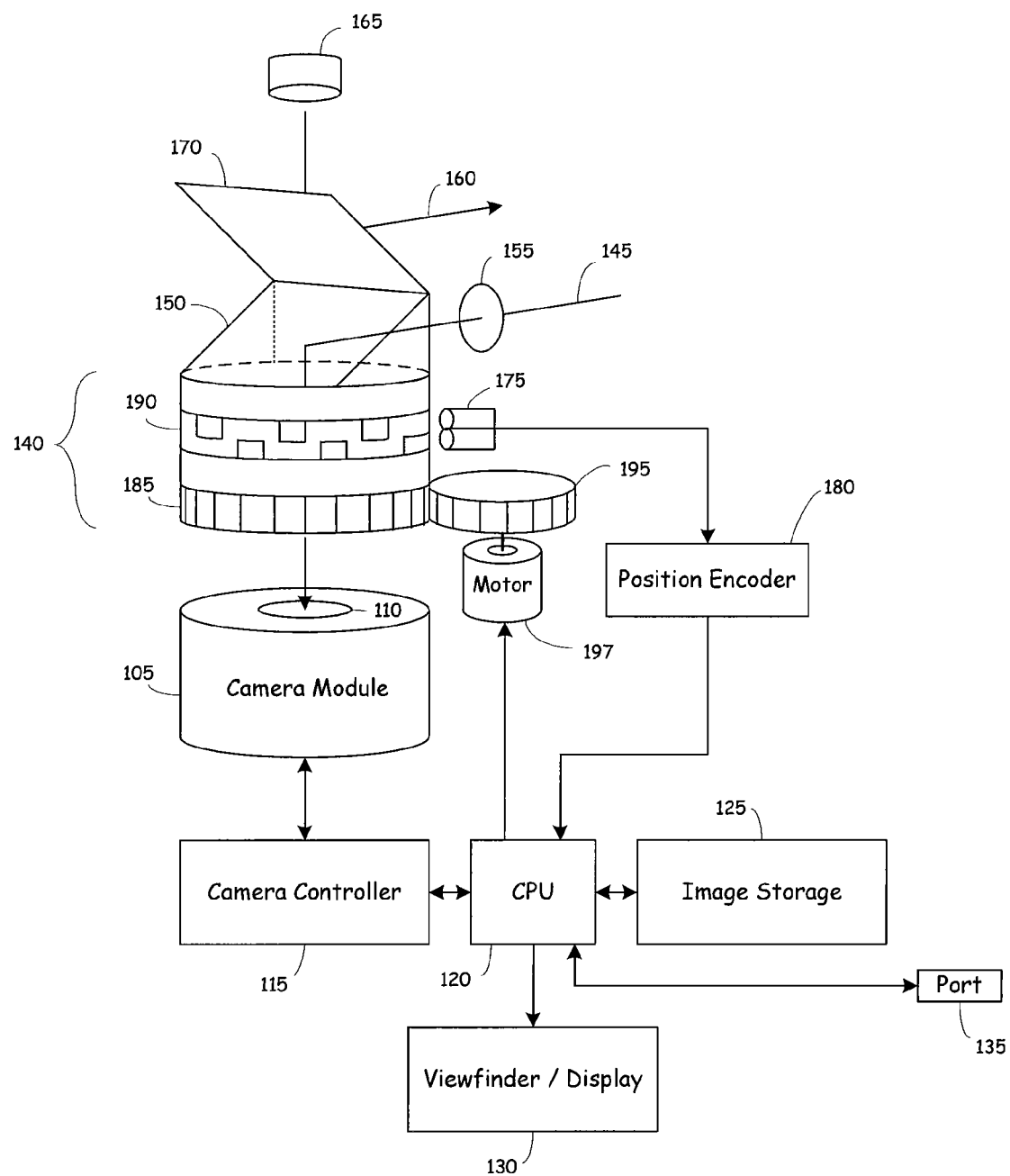
FIG. 1 is a block diagram of the components within an apparatus that comprise the digital camera and rotating prism assembly of the present invention.

FIG. 1 is a block diagram of the components within an apparatus that comprise the digital camera and rotating prism assembly of the present invention. The digital camera component contains a camera module 105 comprised of a CCD sensor and integrated lens 110 coupled with a camera controller 115. The camera controller 115 is also coupled with a CPU 120, digital signal processor, or the like. The camera controller 115 processes the CCD sensor output and encodes an image for the CPU 120 to be stored in an image storage device 125 that is coupled with the CPU 120. During the image capture process, images may be displayed on a viewfinder 130. The viewfinder 130 is typically the display screen of the device.

Subsequent to image capture, images may be exported from the device via a port 135 to other electronic devices, cellular or computer networks via, for example, a USB connection to a PC, a removable media storage device, an infrared (IR) blaster, a short range RF protocol such as Bluetooth™, a cellular data protocol such as, but not limited to, GPRS, EDGE, UMTS, HSPDA, etc.

Also shown is a rotating prism assembly 140. The rotating prism assembly 140 directs an image of the scene 145 to be captured via a first reflective surface 150 through a lens 155 fixed to the device housing into camera module 105 and also directs an illumination beam 160 via an illumination source 165 outward toward the scene using a second reflective surface 170. The rotating prism assembly 140 and the camera module 105 share the same center vertical axis such that the rotating prism assembly 140 can rotate in a plane that is horizontal to camera module 105 all of or some segment of a full 360°.

At one or more angles of rotation, the view provided to camera module 105 may pass through a lens assembly 155 that is fixed to the housing of the portable mobile communication device. Only one lens assembly 155 is shown in FIG. 1 for the sake of simplifying the illustration. However, one feature of the present invention is to be able to provide a plurality of fixed lens assemblies 155 at different angles of rotation. Thus, there can be lens assemblies having different photographic characteristics fixed on the device at various rotation angles. One such lens assembly 155 can be positioned on the same surface as the viewfinder/display 130 to facilitate video-conferencing applications. Another lens assembly 155 can be mounted opposite the viewfinder/display 130 for photographic purposes. These lens assemblies 155 may include, for example, a wide-angle lens, telescopic lens, macro lens, etc.

The first 150 and second 170 reflective surfaces are coupled to one another and form a 90° angle at their intersection. The two reflective surfaces are attached to the rotating prism assembly 130 such that the first reflective surface 150 reflects the image to be captured 145 by the lens assembly 155 450 into the camera module 105 and the second reflective surface 170 reflects an illumination beam 160 emitted by an illumination source 165 45° toward the image to be captured. The illumination source can be, but is not limited to, an LED or xenon flash unit.

The CPU 120 can sense the rotational position of rotating prism assembly 140 by means of a position sensor 175 optically coupled with a position encoder 180. The position encoder 180 encodes the rotational position of rotating prism assembly 140 for CPU 120. The position encoder data informs the CPU 120 of the current rotational state (relative position) of the rotating prism assembly 140. This data lets the CPU 120 determine which, if any, lens assembly 155 is currently active. If no lens assembly 155 is currently active the camera module 105 is in privacy mode. Moreover, the CPU uses the position information to update the user as to camera options based on the current rotation orientation via the display. The CPU via the camera controller 115 also determines whether to display, for instance, a regular viewfinder for a particular rotation orientation, or a picture-in-picture view if the position data indicates that the rotating prism assembly 140 is in a video-conferencing position.

The CPU can also use the position encoder data direct a prism motor 197 to rotate the rotating prism assembly 140 to the desired position via a coupling to a secondary friction surface 195. The secondary friction surface 195 engages a primary friction surface 185 that rings a portion of the rotating prism assembly 140.

Alternatively, the rotating prism assembly 140 may be rotated manually by manipulating the secondary friction surface 195 which is made accessible to the user of the device.

While the camera module lens 110 is typically integrated directly into the camera module 105, there are other implementations possible. For instance, the lens may be implemented in the rotating prism assembly 140 without altering the performance or functionality of the present invention.

FIG. 2 illustrates the rotating prism assembly 140 of FIG. 1 embodied in a portable mobile communications device 200. The portable mobile communication device 200 incorporates the camera module 105 and rotating prism assembly 140. The portable mobile communication device 200 includes a viewfinder/display 130 used for the usual portable mobile communication device 200 functions (display of dialed digits, etc.) and also as a viewfinder for the integrated camera module 105. The portable mobile communication device 200 also includes a keypad 210 and a camera function button 220 that is used to initiate image capture by camera module 105. As stated earlier, the rotating prism assembly 140 may be rotated manually using the secondary friction surface 195 accessible to the user of the portable mobile communication device. The secondary friction surface 195 can be implemented, for instance, as a jog dial that protrudes from the housing of the portable mobile communication device 200. The secondary friction surface 195 is manually coupled to the primary friction surface 185. When the user engages the secondary friction surface 195 it engages the primary friction surface 185 that is part of the rotating prism assembly 140 causing the entire rotating prism assembly 140 to rotate about a perpendicular axis. The secondary friction surface 195 and portable mobile communication device housing can be marked with alignment lines 240 to indicate to the user when a lens assembly 155 (not shown in FIG. 2) is lined up and has become active.

In both the 0° and 180° rotation positions, illumination source 165 is reflected via the second reflective surface 170 attached to the rotating prism assembly 140 through illumination apertures that are not shown in FIG. 2.

Figure 3A:
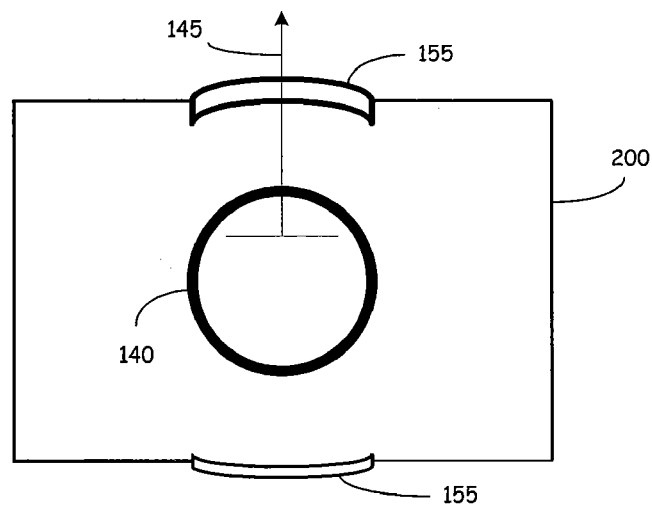
FIG. 3A is a top view of the rotating prism assembly illustrating an active field of view at 0°.

FIG. 3A is a top view of the rotating prism assembly illustrating an active field of view at 0° in which the image directed toward the camera module 105 (not pictured) follows path 145 through lens 155 which may be a wide angle lens, zoom lens, macro lens, etc. This particular path 145 can correspond to a field of view that is opposite the viewfinder/display 130. This is the common position for using the portable mobile communication device 200 as a digital camera in which the viewfinder/display 130 is visible to the user to frame the photograph.

Figure 3B:
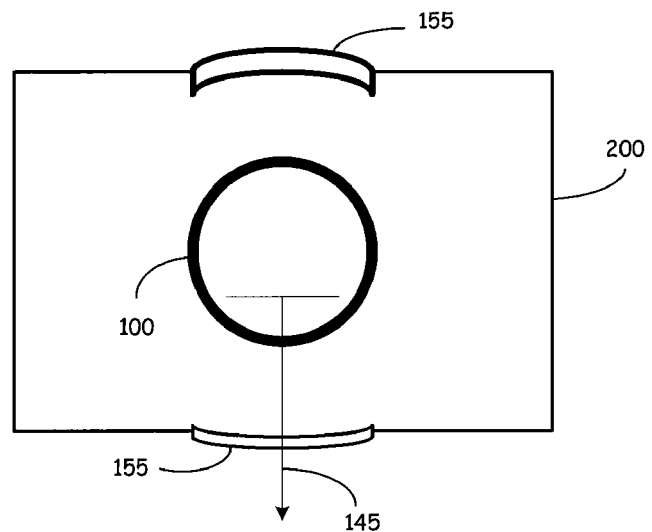
FIG. 3B is a top view of the rotating prism assembly illustrating an active field of view at 180°.

FIG. 3B is a top view of the rotating prism assembly illustrating an active field of view at 180° in which the image directed toward the camera module 105 (not pictured) also follows path 145 through lens 155. The 180° orientation creates an image path 145 that can correspond to a field of view that is the same the viewfinder/display 130. This is the common position for using the portable mobile communication device 200 in a video-conferencing mode where the lens assembly 155 and the viewfinder/display 130 are both visible to the user. The user can both record his own image to be transmitted to the other party and view the image of the other party on the viewfinder/display 130. The viewfinder/display 130 can even be configured as picture-in-picture to view the other party and also see how the other party views the user. The most common lens assembly 155 used for video conferencing is likely to be a wide angle lens.

Figure 3C:
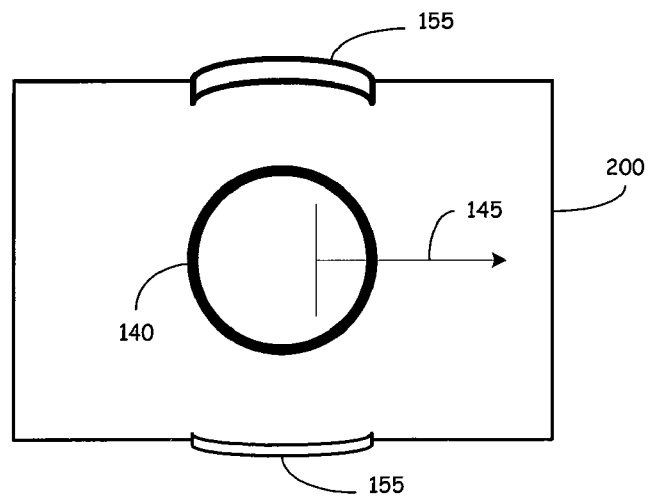
FIG. 3C is a top view of the rotating prism assembly illustrating an inactive field of view at 90° representing a privacy mode.

FIG. 3C is a top view of the rotating prism assembly illustrating an inactive field of view at 90° representing a privacy mode. At one or more angles of rotation, the view provided to camera module 105 may be blocked so that the portable mobile communication device 200 is in a "privacy mode" and is incapable of capturing any images. Privacy mode will occur anytime the user has manually rotated the rotating prism assembly such that the image path 145 does not pass through one of the lens assemblies 155 that are attached to the housing of the portable mobile communication device 200. This prevents inadvertent photography/videography.

The present invention has described and illustrated the use of two lens assemblies 155 attached to the housing of the portable mobile communication device 200. Additional lens assemblies 155 can be incorporated into the portable mobile communication device 200 housing along the horizontal plane of the rotating prism assembly 140 at various intervals of the 360° circular rotation. Multiple lens assemblies allow for the portable mobile communication device 200 to use a single camera module 105 to obtain images having different characteristics since each lens assembly can differ. One may be a telephoto lens, one may be a wide angle lens, one may be a standard lens, and so on.

Figure 4:
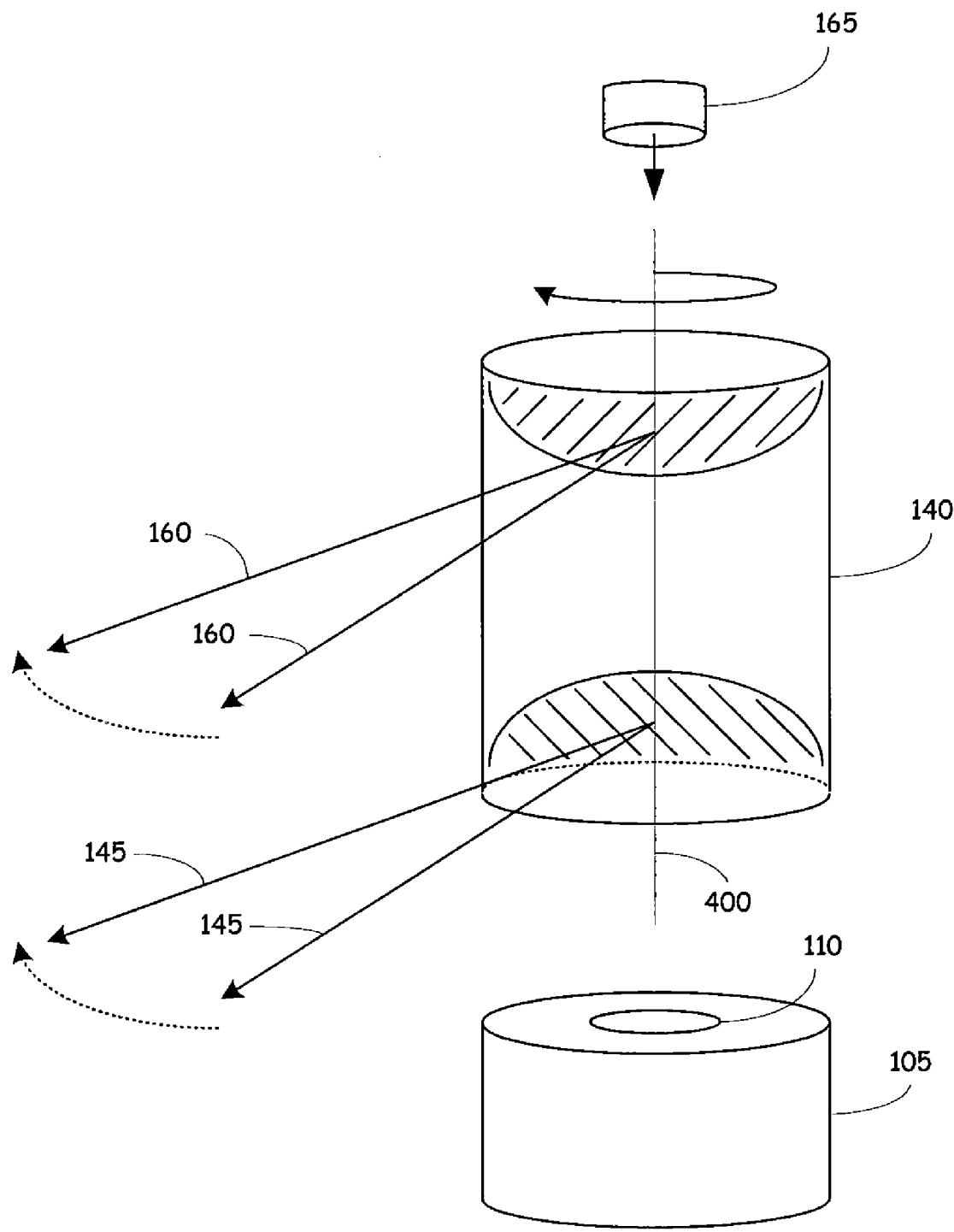
FIG. 4 illustrates how the rotating prism assembly can be manipulated to provide for horizontal panning.

FIG. 4 illustrates how the rotating prism assembly can be manipulated to provide for horizontal panning. As prism assembly 200 rotates horizontally about vertical axis 410, the image path 145 directed to stationary camera module 105 pans horizontally. Likewise, reflected illumination 160 from the stationary illumination source 165 also pans horizontally, and illumination tracks the image being captured. To achieve vertical panning, the entire device is simply rotated 90° from landscape orientation to portrait orientation.

Rotation of the rotating prism assembly 140 may be accomplished manually or automatically using a motor or other such mechanism. For example, smooth panning may be used for face-tracking by performing image analysis and moving the rotating prism assembly 140 with one or more motors so as to keep a person's face visually centered in the scene captured by camera module 105.

FIG. 5 illustrates how a spherical prism assembly can be manipulated to provide for horizontal and vertical panning without altering the orientation of the portable mobile communication device. A spherical prism assembly 500 (as opposed to a cylindrical prism assembly) can rotate in all directions about its center point 510. As it rotates, the image path 145 directed to stationary camera module 105 pans in both the vertical and horizontal dimensions. Likewise, reflected illumination 160 from stationary illumination source 165 pans in both the vertical and horizontal dimensions, and illumination tracks the image being captured. The sphere can be rotated by means of a trackball type mechanism that is in contact with the spherical prism assembly 500. The trackball mechanism would protrude from the housing of the portable mobile communication device 200 such that the user could manipulate the trackball and the motion would be transferred to the spherical prism assembly 500 causing it to rotate in the opposite direction of the trackball.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. An apparatus that can be manipulated to provide a plurality of views to a single camera module, comprising:
   a cylindrical rotating prism assembly that permits light to pass through and can be rotated about its vertical axis;
   a first reflective surface for reflecting the field of view of a lens assembly 90° along the vertical axis of the cylindrical rotating prism assembly, the first reflective surface coupled with the cylindrical rotating prism assembly to form a 45° angle with the top surface area of the cylindrical rotating prism assembly;
   a camera module positioned directly beneath and along the vertical axis of the cylindrical rotating prism assembly to capture an image reflected by the first reflective surface along the vertical axis of the cylindrical rotating prism assembly;
   an illumination source positioned directly above the cylindrical rotating prism assembly for emitting an illumination beam along the vertical axis of the cylindrical rotating prism assembly; and
   a second reflective surface coupled with the first reflective surface wherein the first and second reflective surfaces form a 90° angle at their intersection such that the illumination beam emitted by the illumination source is re-directed 90° through an illumination aperture that is positioned in-line with the lens assembly and illuminates the field of view of the lens assembly.

2. The apparatus of claim 1 wherein the cylindrical rotating prism assembly further comprises a primary friction surface that rings a portion of the cylindrical rotating prism assembly and when engaged by a secondary friction surface causes the cylindrical rotating prism assembly to rotate.

3. The apparatus of claim 1 wherein the cylindrical rotating prism assembly further comprises: a position encoder that rings a portion of the cylindrical rotating prism assembly; and a position encoder sensor for sensing the position of the position encoder.

4. The apparatus of claim 3 further comprising:
   a prism motor for rotating the cylindrical rotating prism assembly using position data detected by the position encoder sensor.

5. The apparatus of claim 4 wherein the prism motor can rotate the cylindrical rotating prism assembly to allow for panning of the image.

6. The apparatus of claim 4 wherein the apparatus is housed within a portable mobile communications device.

7. The apparatus of claim 6 wherein a plurality of lens assemblies are integrated into the portable mobile communications device such that the cylindrical rotating prism assembly can be manipulated to provide a field of view to the camera module for each lens assembly.

8. The apparatus of claim 4 wherein the apparatus is housed within a digital camera device.

9. The apparatus of claim 8 wherein a plurality of lens assemblies are integrated into the digital camera device such that the cylindrical rotating prism assembly can be manipulated to provide a field of view to the camera module for each lens assembly.

* * * * *